(12) United States Patent
Kashani-Shirazi

(10) Patent No.: US 9,643,360 B2
(45) Date of Patent: May 9, 2017

(54) SELF-HARDENING MATERIAL AND PROCESS FOR LAYERWISE FORMATION OF MODELS

(75) Inventor: Kaveh Kashani-Shirazi, Munich (DE)

(73) Assignee: VOXELJET AG, Friedberg (DE)

( * ) Notice: Subject to any disclaimer, the term of this patent is extended or adjusted under 35 U.S.C. 154(b) by 1918 days.

(21) Appl. No.: 12/377,137

(22) PCT Filed: Aug. 6, 2007

(86) PCT No.: PCT/DE2007/001372
§ 371 (c)(1),
(2), (4) Date: Jun. 18, 2010

(87) PCT Pub. No.: WO2008/022615
PCT Pub. Date: Feb. 28, 2008

(65) Prior Publication Data
US 2010/0291314 A1  Nov. 18, 2010

(30) Foreign Application Priority Data
Aug. 20, 2006 (DE) .......................... 10 2006 038 858

(51) Int. Cl.
*B29C 67/00* (2017.01)
*B29K 33/00* (2006.01)
*B29K 105/16* (2006.01)

(52) U.S. Cl.
CPC ...... *B29C 67/0077* (2013.01); *B29C 67/0081* (2013.01); *B29K 2033/12* (2013.01); *B29K 2105/16* (2013.01)

(58) Field of Classification Search
CPC .................................. B29C 67/0077

USPC ........................................................ 264/113
See application file for complete search history.

(56) References Cited

U.S. PATENT DOCUMENTS

| | | | |
|---|---|---|---|
| 2,640,629 A | 6/1953 | Thomson et al. | |
| 2,692,142 A | 10/1954 | Hunter | |
| 2,857,938 A | 10/1958 | Wahl | |
| 3,616,969 A | 11/1971 | Koizumi | |
| 3,616,972 A | 11/1971 | Christy | |
| 3,815,527 A | 6/1974 | Dobbins | |
| 3,913,503 A | 10/1975 | Becker | |
| 4,203,674 A * | 5/1980 | Laleman | 366/2 |
| 4,239,715 A | 12/1980 | Pratt | |

(Continued)

FOREIGN PATENT DOCUMENTS

| | | |
|---|---|---|
| AU | 720255 B2 | 5/2000 |
| DE | 4300478 | 8/1994 |

(Continued)

OTHER PUBLICATIONS

US 4,937,420, 06/1990, Deckard (withdrawn)

(Continued)

*Primary Examiner* — Larry Thrower
(74) *Attorney, Agent, or Firm* — The Dobrusin Law Firm, P.C.

(57) ABSTRACT

The invention relates to a self-hardening material for layerwise construction of three-dimensional components, whereby the material comprises at least one particulate material and a separately applied bonding agent for bonding the particulate material, and has a setting time which is at least several times as long as the application time of a particulate layer.

25 Claims, 3 Drawing Sheets

(56) References Cited

U.S. PATENT DOCUMENTS

| | | |
|---|---|---|
| 4,247,508 A | 1/1981 | Housholder |
| 4,279,949 A | 7/1981 | Esser |
| 4,369,025 A | 1/1983 | Von Der Weid |
| 4,575,330 A | 3/1986 | Hull |
| 4,579,252 A | 4/1986 | Wilson |
| 4,630,755 A | 12/1986 | Campbell |
| 4,665,492 A | 5/1987 | Masters |
| 4,669,634 A | 6/1987 | Leroux |
| 4,752,352 A | 6/1988 | Feygin |
| 4,863,538 A | 9/1989 | Deckard |
| 4,876,294 A | 10/1989 | Shriver et al. |
| 4,889,433 A | 12/1989 | Pratt |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,059,266 A | 10/1991 | Yamane et al. |
| 5,076,869 A | 12/1991 | Bourell et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,221,539 A | 6/1993 | Pallerberg et al. |
| 5,248,456 A | 9/1993 | Evans, Jr. et al. |
| 5,252,264 A | 10/1993 | Forderhase et al. |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,431,967 A | 7/1995 | Manthiram et al. |
| 5,433,520 A | 7/1995 | Adams |
| 5,482,659 A | 1/1996 | Sauerhoefer |
| 5,490,962 A | 2/1996 | Cima et al. |
| 5,506,607 A | 4/1996 | Sanders, Jr. et al. |
| 5,518,680 A | 5/1996 | Cima et al. |
| 5,554,330 A | 9/1996 | Flannery et al. |
| 5,555,176 A | 9/1996 | Menhennett et al. |
| 5,573,055 A | 11/1996 | Melling et al. |
| 5,597,589 A | 1/1997 | Deckard |
| 5,601,868 A | 2/1997 | Gerhardt |
| 5,616,294 A | 4/1997 | Deckard |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,730,925 A | 3/1998 | Mattes et al. |
| 5,740,051 A | 4/1998 | Sanders, Jr. et al. |
| 5,753,274 A | 5/1998 | Wilkening et al. |
| 5,807,437 A | 9/1998 | Sachs et al. |
| 5,851,465 A | 12/1998 | Bredt |
| 5,902,441 A | 5/1999 | Bredt et al. |
| 5,902,537 A | 5/1999 | Almquist et al. |
| 5,934,343 A | 8/1999 | Gaylo et al. |
| 5,943,235 A | 8/1999 | Earl et al. |
| 5,965,170 A | 10/1999 | Matsuoka et al. |
| 6,007,318 A | 12/1999 | Russell et al. |
| 6,036,777 A | 3/2000 | Sachs |
| 6,037,389 A | 3/2000 | Archibald et al. |
| 6,042,774 A | 3/2000 | Wilkening et al. |
| 6,048,188 A | 4/2000 | Hull et al. |
| 6,094,994 A | 8/2000 | Satake et al. |
| 6,116,517 A | 9/2000 | Heinzl et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,165,406 A | 12/2000 | Jang et al. |
| 6,193,922 B1 | 2/2001 | Ederer |
| 6,217,816 B1 | 4/2001 | Tang |
| 6,258,170 B1 | 7/2001 | Somekh et al. |
| 6,259,962 B1 | 7/2001 | Gothait |
| 6,286,585 B1 | 9/2001 | Twardowska et al. |
| 6,305,769 B1 | 10/2001 | Thayer et al. |
| 6,316,060 B1 | 11/2001 | Elvidge et al. |
| 6,322,728 B1 | 11/2001 | Brodkin et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,467,525 B2 | 10/2002 | Herreid et al. |
| 6,476,122 B1 | 11/2002 | Leyden |
| 6,500,378 B1 | 12/2002 | Smith |
| 6,552,130 B1* | 4/2003 | Makino et al. ............... 525/222 |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,733,528 B2 | 5/2004 | Abe et al. |
| 6,764,636 B1 | 7/2004 | Allanic et al. |
| 6,830,643 B1 | 12/2004 | Hayes |
| 6,838,035 B1 | 1/2005 | Ederer et al. |
| 7,004,222 B2 | 2/2006 | Ederer et al. |
| 7,137,431 B2 | 11/2006 | Ederer et al. |
| 7,204,684 B2 | 4/2007 | Ederer et al. |
| 8,741,194 B1 | 6/2014 | Ederer et al. |
| 2001/0050031 A1 | 12/2001 | Bredt et al. |
| 2002/0026982 A1 | 3/2002 | Bredt et al. |
| 2002/0111707 A1 | 8/2002 | Li et al. |
| 2003/0083771 A1 | 5/2003 | Schmidt |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0038009 A1* | 2/2004 | Leyden et al. ............ 428/195.1 |
| 2004/0056378 A1 | 3/2004 | Bredt et al. |
| 2004/0094058 A1 | 5/2004 | Kasperchik et al. |
| 2004/0145088 A1 | 7/2004 | Patel et al. |
| 2004/0170765 A1 | 9/2004 | Ederer et al. |
| 2005/0017394 A1 | 1/2005 | Hochsmann et al. |
| 2005/0093194 A1* | 5/2005 | Oriakhi et al. ............... 264/113 |
| 2005/0167872 A1 | 8/2005 | Tsubaki et al. |
| 2006/0105102 A1 | 5/2006 | Hochsmann et al. |
| 2006/0108090 A1 | 5/2006 | Ederer et al. |
| 2006/0175346 A1 | 8/2006 | Ederer et al. |
| 2006/0237159 A1 | 10/2006 | Hochsmann |
| 2008/0001331 A1 | 1/2008 | Ederer |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0260945 A1 | 10/2008 | Ederer et al. |
| 2009/0261497 A1 | 10/2009 | Ederer et al. |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0272519 A1 | 10/2010 | Ederer et al. |
| 2011/0223437 A1 | 9/2011 | Ederer et al. |
| 2011/0308755 A1 | 12/2011 | Hochsmann |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0199444 A1 | 8/2013 | Hartmann |

(56) References Cited

U.S. PATENT DOCUMENTS

| | | |
|---|---|---|
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0202381 A1 | 7/2014 | Ederer et al. |
| 2014/0212677 A1 | 7/2014 | Gnuchtel et al. |
| 2014/0227123 A1 | 8/2014 | Gunster |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |

FOREIGN PATENT DOCUMENTS

| | | |
|---|---|---|
| DE | 4325573 | 2/1995 |
| DE | 29506204.5 | 4/1995 |
| DE | 4400523 | 7/1995 |
| DE | 4440397 | 9/1995 |
| DE | 19511772 A1 | 10/1996 |
| DE | 29701279 | 1/1997 |
| DE | 19545167 A1 | 6/1997 |
| DE | 19723892 C1 | 9/1998 |
| DE | 19846478 C2 | 4/2000 |
| DE | 19853834 | 5/2000 |
| DE | 10047614 | 4/2002 |
| DE | 10117875 | 1/2003 |
| DE | 10216013 | 10/2003 |
| DE | 69634921 T2 | 12/2005 |
| EP | 0361847 B1 | 4/1990 |
| EP | 0431924 B1 | 6/1991 |
| EP | 0688262 | 12/1995 |
| EP | 0711213 | 5/1996 |
| EP | 0734842 | 10/1996 |
| EP | 0739666 | 10/1996 |
| EP | 0734842 | 8/1999 |
| EP | 0968776 | 1/2000 |
| EP | 1163999 A2 | 5/2001 |
| EP | 1163999 | 12/2001 |
| EP | 1415792 | 5/2004 |
| EP | 1442870 | 8/2004 |
| FR | 2790418 | 9/2000 |
| GB | 2382798 | 6/2003 |
| WO | 95/18715 A1 | 7/1995 |
| WO | 96/05038 A1 | 2/1996 |
| WO | 00/03324 | 1/2000 |
| WO | 00/21736 A1 | 4/2000 |
| WO | 00/51809 A1 | 9/2000 |
| WO | 01/26885 A1 | 4/2001 |
| WO | 01/72502 A1 | 4/2001 |
| WO | 01/34371 A2 | 5/2001 |
| WO | 02/26419 A1 | 4/2002 |
| WO | 02/26420 A1 | 4/2002 |
| WO | 02/26478 | 4/2002 |
| WO | 02/26478 A1 | 4/2002 |
| WO | 02/28568 | 4/2002 |
| WO | 02/064353 A1 | 8/2002 |
| WO | 02/064354 A1 | 8/2002 |
| WO | 02/083323 A2 | 10/2002 |
| WO | 03/016030 A1 | 2/2003 |
| WO | 003/016067 A2 | 2/2003 |
| WO | 03/086726 A1 | 10/2003 |
| WO | 03/097518 A2 | 11/2003 |
| WO | 03/103932 A1 | 12/2003 |
| WO | 2004/010907 A1 | 2/2004 |
| WO | 2004/110719 A2 | 12/2004 |
| WO | 2004/112988 A2 | 12/2004 |
| WO | 2005/082603 A1 | 9/2005 |
| WO | 20005/080010 A1 | 9/2005 |
| WO | 2005/113219 A1 | 12/2005 |

OTHER PUBLICATIONS

Machine translation of PCT/DE07/01372.*
International Search Report and Written Opinion, Application No. PCT/DE2007/001372, published as WO2008/022615, dated Feb. 14, 2008.
Cima et al., "Computer-derived Microstructures by 3D Printing: Bio- and Structural Materials," SSF Symposium, Austin, TX, 1994.
Copending National Phase Application, WO 02/083323, Oct. 24, 2002.
Copending National Phase Application, WO 02/26419, Apr. 4, 2002.
Copending National Phase Application, WO 02/26420, Apr. 4, 2002.
Copending National Phase Application, WO 03/086726, Oct. 17, 2005.
Copending National Phase Application, WO 03/097518, Jun. 24, 2005.
Copending National Phase Application, WO 03/103932, Dec. 18, 2003.
Copending National Phase Application, WO 04/11298, Dec. 8, 2005.
Copending National Phase Application, WO 05/080010, Sep. 1, 2005.
Copending National Phase Application, WO 05/113219, Dec. 1, 2005.
Copending U.S. Appl. No. 10/866,205, (Published as 2005/0017394), Jun. 11, 2004.
Copending U.S. Appl. No. 11/767,778, filed Jun. 25, 2007 (Published as 2005-0001331), Jun. 25, 2007.
Copending U.S. Appl. No. 11/320,050 (corresponds with PCT WO 02/26420), U.S. Pat. No. 7,137,431),Dec. 28, 2005.
EOS Operating Manual for Laser Sintering Machine, Part 1 with Brief Summary, Feb. 22, 2005.
EOS Operating Manual for Laser Sintering Machine, Part 2 with Brief Summary, Feb. 22, 2005.
Feature Article—Rapid Tooling—Cast Resin and Sprayed Metal Tooling by Joel Segal, Apr. 2000.
Gephart, Rapid Prototyping, pp. 118-119, 1996.
International Search Report, PCT/DE00/03324, (Published as WO2002/026419, Jun. 5, 2001.
International Search Report, PCT/DE01/03661, (Published as WO2002/026420), Feb. 28, 2002.
International Search Report, PCT/DE01/03662, (Published as WO2002/026478) Mar. 1, 2002.
International Search Report, PCT/DE02/01103, (Published as WO2002/083323), Sep. 30, 2002.
International Search Report, WO 04/110719, Jan. 11, 2005.
International Search Report, WO 2005-113219, Dec. 1, 2005.
Jacobs et at, 2005 SME Technical Paper, title "Are QuickCast Patterns Suitable for Limited Production?".
Marcus et al., Solid Freedom Fabrication Proceedings, Nov. 1993.
Marcus, et al., Solid Freeform Fabrication Proceedings, Sep. 1995, p. 130-33.
Opposition of Patent No. DE100476014, Jun. 25, 2003.
Opposition to European Patent No. 1322458 B1, Jan. 19, 2005.
Sachs et al., "Three-Dimensional Printing: Rapid Tooling and Prototypes Directly from a CAD Model", Massachusetts Institute of Technology, pp. 131-136.
Sachs et al., "Three-Dinionsional Printing: Rapid Tooling and Prototypes Directly from a CAD Model", Massachusetts Insistute of Technology, pp. 143 & 151, Jan. 1990.
Williams, "Feasibility Study of Investment Casting Pattern Design by Means of Three Dimensional Printing", Department of Machanical Enginerring, pp. 2-15, Jun. 1987.
Copending National Phase Application, WO 02/28568, dated Apr. 11, 2002 with English Translation.

(56) References Cited

OTHER PUBLICATIONS

Copending National Phase Application, WO 02/26478, dated Apr. 4, 2002 with English Translation.
Copending U.S. Appl. No. 14/292,961, filed Jun. 2, 2014, published as US 2014/0322501.
Copending U.S. Appl. No. 13/957,915, filed Aug. 2, 2013, published as US 2013/0313757.
Copending U.S. Appl. No. 13/957,915 dated Oct. 21, 2016.

* cited by examiner

SELF-HARDENING MATERIAL AND PROCESS FOR LAYERWISE FORMATION OF MODELS

CLAIM OF PRIORITY

The present application claims priority from German Application No. DE 102006038858.5, filed on Aug. 20, 2006 and is the National Phase of PCT Application PCT/DE2007/001372, filed on Aug. 6, 2007, disclosure of which is hereby incorporated by reference herein.

FIELD OF THE INVENTION

This invention relates to a self-hardening material and a process for layered formation of three-dimensional components.

BACKGROUND

The process for the formation of three-dimensional components has been known for a long time.

For example, European Patent EP 0 431 924 B1 describes a process for the manufacture of three-dimensional objects from computer data. It describes a particulate material that can be deposited in a thin layer on a platform and selectively printed with a binder using a print head. The printed area is bonded and sets under the influence of the binder. The platform is lowered by the thickness of one layer and a new layer of particulate material is spread and is also bonded. These steps are repeated until a given height is achieved. A three-dimensional object is created from the printed and bonded areas. The object, which is embedded in loose particulate material, is released from the platform, then removed from the loose particulate material.

It is observed that objects formed by this process have been shown to have poor dimensional stability due to uneven hardening and therefore the tolerances in the formed components are relatively high.

SUMMARY OF THE INVENTION

Accordingly, pursuant to a first aspect of the present invention, there is contemplated a self-hardening material for layerwise construction of three-dimensional components, whereby the material com-prises at least one particulate material and a separately applied bonding agent for bonding the particulate material, and where the setting time is at least several times as long as the application time of a particulate layer.

The invention of the first aspect may be further characterized by one or any combination of the features described herein, such as the setting time is greater than 20 times as long as the application time of the particulate layer; setting of the binding material takes place after formation of the component; the component demonstrates uncured setting within 72 hours; the binder contains at least one component of the group including acrylate, methacrylate and/or sterols; the particulate material used is polymethylmethacrylate; the binding material can be polymerised using UV light, radiation, heat and/or reactive activators; the binder is composed of a multi-component bonding system; the binding material used is polyurethane resin or epoxy resin; the binder releases at least part of the particulate material; the binder contains further ingredients for the improvement of printability, such as, for example, an increase or decrease in viscosity and/or surface tension; the particulate material used is a filler material.

Accordingly, pursuant to a second aspect of the present invention, there is contemplated a process for layerwise construction of three-dimensional components, whereby the material comprises at least one particulate material and a bonding agent for self-hardening of the particulate material, with a setting time which is at least several times as long as the application time of a particulate layer.

The invention of the second aspect may be further characterized by one or any combination of the features described herein, such as the setting time is between 20 and 150 times as long as the application time for the particulate layer; the component demonstrates uncured setting within 72 hours; the setting time is controlled by process temperature; the polymerisation of the binder using UV light, radiation, heat and/or reactive activators is employed.

BRIEF DESCRIPTION OF THE DRAWINGS

Examples of the preferred embodiment of the invention are described in relation to the following drawings which are explained in detail.

The drawings show.

DETAILED DESCRIPTION

Figure 1:
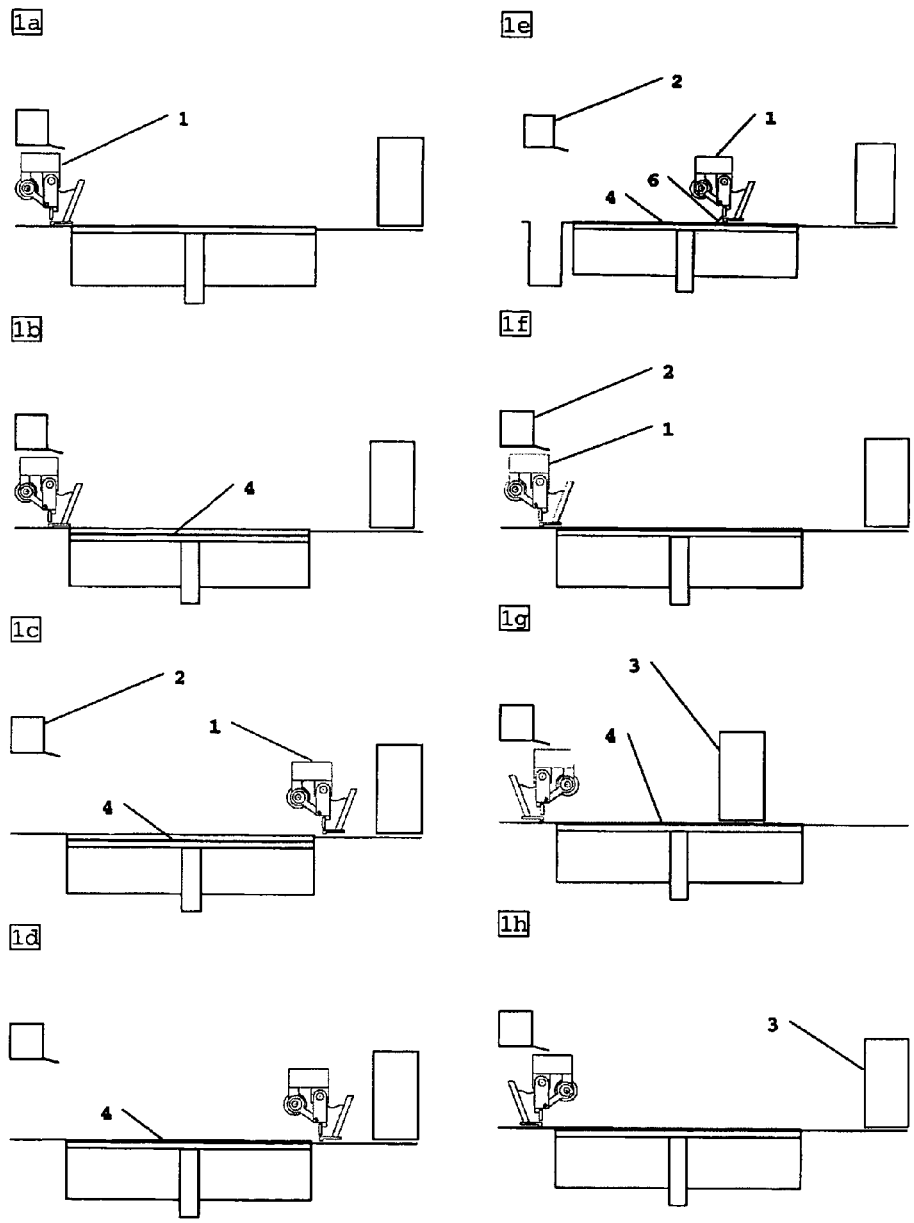
FIG. 1a-h, illustrate a side view of the order of process of the invention according to the preferred embodiment.

In contrast to the invention described above is a self-hardening material for layered formation of three-dimensional components, whereby the material comprises at least one particulate material and a separate binding material for bonding the particulate material, and a setting duration which is at least several times as long as the application time of the particulate layer.

With such a material it is then possible that the first formed underlying layer is only bonded and hardened after a specific period of time. Subsequent layers do not harden until after this period has elapsed. Due to the similar time of hardening, no stress occurs in the printed area, and therefore there is no significant warping or deformation.

A self-hardening system in the sense of this invention is intended to mean a bonding system which, without outside influence (in the form of temperature, energy input, etc.) that can harden within 72 hours. The time required is referred to as setting time.

This is not intended to mean complete hardening. A green cure is sufficient in which the form of the component is stable, but cannot bear loads. This means that the components should be able to support their own weight. A large part (>50%) of the shrinkage which takes place during hardening occurs during this time.

Achieving delayed hardening in the sense of the invention involves allowing less than 5% of setting, and hence shrinkage, to occur within a layer before the next layer is deposited.

A further advantage of the invention shown here is a process for the layered formation of three-dimensional components, whereby the material comprises at least one particulate material and a separate binding material for bonding the particulate material, and a setting duration which is at least several times as long as the application time of the particulate layer. Preferably, the setting time is greater than 20 times as long as the application time of the particulate layer.

As a result of setting time, commencement of setting, and delaying shrinkage, hardening of the entire piece can be made effectively simultaneous (relative to the overall time frame). As a consequence the component shrinks overall by the same amount and at the same time, so that no stress is developed. Any stresses developed by the small amount of shrinkage during the formation phase are relieved in the soft components which have yet to harden.

The uniform shrinkage can, as with casting models, be accounted for using a scaling factor during the CAD model scaling process. If the component decreases during hardening by a factor of X, the model can be made larger by the same factor X. Process related shrinkage will then result in a model of the correct size.

The speed of reaction (i.e. setting) depends on the time taken to deposit a layer and dope it, and on the height of a layer. It is usually not necessary to delay hardening until the entire model is formed. As a rule, a delay in hardening for the time it takes to build up at least 20 layers is sufficient.

A particular advantage has been demonstrated if the component sets within at least 48 hours.

The optimal value for the delay necessary for a certain component and material can be determined by a person skilled in the art using a simple trial (making and testing a sample part).

Often, a hardening delay of 150 particulate layers is sufficient.

In the preferred embodiment, however, and depending on the component and material used, it can also be advantageous if the setting (i.e. solidification) only occurs after formation of the entire component.

Setting delay can be effected, for example, by lowering the temperature during formation.

According to a further embodiment of the present invention, it can also be a benefit if reaction inhibitors are added to the bonding agent and/or particulate material.

Further, a slow acting binder can be used.

With materials and processes disclosed by this invention it is now possible to use materials which up to now have been deemed inappropriate due to their tendency to shrink.

Within the meaning of this invention, bonding agents and/or binders include all substances that can bind the particulate material and can form a coherent structure. Various materials and reaction mechanisms are appropriate for this. Binders and particulate materials especially must be part of a suitable system.

Examples of appropriate materials and reaction mechanisms include the following:

Monomeric binder systems based on acrylates, methacrylates, styrols, cross-linked or not cross-linked, polymerisation triggered by UV light, radiation, heat, reactive activators.

Multiple component glue systems such as polyurethane resins or epoxy resins for which cross-linking occurs through the reaction of two components.

Substances which dissolve all or part of the particulate materials and bond them in this way.

The binding material can also contain different solvents and/or monomers, chemicals that cause cross-linking and/or reaction assisting chemicals such as delayers, catalysts and fillers (e.g. nanoparticles). In order to improve the print characteristics, the binder liquid can contain yet further additives e.g. for changing viscosity.

In an especially preferred embodiment of the invention, the particulate material contains fillers in order to minimize shrinkage of the component or to improve the material's characteristics Furthermore, additives such as initiators, catalysts and delayers can be added to the particulate material which, for example, may be required for the bonding reaction.

In an especially preferred embodiment of the process, the bonding of the grains of the particulate material can be achieved by solvents.

A particular advantage of this in the preferred embodiment is the use of a highly soluble plastic such as, for example, polyethylmethacrylate as the particulate material.

The binding material can contain solvents, such as alcohols, ketones or acetates. It can also be a mixture of different solvents.

Because the binding material contains a solvent, there is no need for preparing and dosing the binder, in order, for example, to prevent the plugging of print heads.

The bonding function of the solvent according to this preferred embodiment is based on the grains of the particulate material being dissolved in the printed areas and bonded together. When the solvent escapes, the contact surfaces of the grains are bonded and a solid region is established. In some cases, a reduction in material can be seen.

Because setting and shrinkage are linked to the degree of thinning out of the solvent, even setting within the component can be achieved by slowing down the evaporation rate, thereby reducing deformation.

In a preferred embodiment of the process, this can be achieved through control of, and especially reduction of the process temperature.

In a further preferred embodiment of the process, one can delay the volatilisation of alcohol through the addition of a moisture-containing material such as monoethylene glycol.

A particularly beneficial solution can be achieved by varying the solvents used. The higher alcohols (n-butanol, pentanol, hexanol, etc.), which have higher boiling points and lower steam pressure, can provide a simple and effective way to reduce evaporation.

With a process temperature of, for example, 20° C. and the use of a polyethylmethacrylate-containing particulate material, pentanol can achieve very good results when used as a solvent. In a preferred embodiment of the invention the solvent can be printed (i.e. applied) using a drop-on-demand print head onto a previously applied particulate layer. The amount of pentanol used corresponds for example to about 9% by weight of the particulate material. Components so formed display no measurable deformation. The bonding of the components is greater than by other known processes. Because only a simple plastic powder and alcohol are used as reagents, the material costs are also low.

The components can be cured either in a powder bed or individually, according to readiness, at room temperature or at a specified temperature.

If the components are taken out of the powder bed before curing, care must be taken to ensure that uneven drying does not cause deformation. A component can, for example, dry out in an uneven way if it is lying on a non-porous surface. The underside remains moist longer under these circumstances and can eventually lead to deformation during curing of the component.

It can therefore be advantageous for deformation free components because they can dry out evenly.

Furthermore, components which are still wet and delicate could be damaged by being taken away or warp under their self weight.

In a preferred embodiment of the invention, drying takes place in such a way that the component is left for a period of time in a loose powder bed and is covered with powder until it is adequately dried. One should take care that the powder bed is adequately permeable for the solvent.

If the particulate material itself is able to transport the solvent, the component can be dried as far as possible, or completely, in the powder bed. This allows the solvent to diffuse in the powder bed from grain to grain. It is important that the particulate material is soluble in the solvent.

In the sense of this invention, however, the filling material can also be chosen such that it, at least partially, takes up and/or passes on the solvent.

In addition, the solvent can also be chosen such that it is sufficiently taken up and/or passed on by the filling material.

By using solvent as a binding material to bond the particulate material, only a limited strength of the components can be achieved, because after evaporation of the solvent a porous structure remains.

In order to achieve even higher strength, according to the preferred embodiment, one can advantageously employ additional material in the form of a binder in the powder bed.

Almost all of the appropriate binders for the process demonstrate a volume reduction on setting. For example, the setting reaction of radical-polymerised binders breaks the double bonding of the monomers, and forms a bond to the next monomer. The distance between the molecules is reduced if they polymerise into such a macromolecule, which appears on the macroscopic level as volume reduction. With polymerisation of the monomer methylmethacrylate to polymethylmethacrylate, for example, shrinkage of 21% is observed.

In a particularly beneficial embodiment of the process, a binder based on various methacrylates and/or styrols is used which, for example, can be selectively laid down using a piezoelectric print head onto a powder layer.

In addition to a monomer the binding material can also be a cross-linking agent (e.g. multifunctional methacrylate). A catalyst (toluidine) and/or delayer (chinon) can also be used.

Further additives and reagents are forseeable. A person skilled in the art can set the characteristics of the binding material, and thus of the component, by modifying the binder makeup thus creating a targeted material.

Furthermore, it is possible to add other chemicals to increase or reduce viscosity, surface tension and/or other print characteristics that change way the binder flows. In this way, the printability of the binder can be improved.

In a preferred embodiment of the present invention, the particulate material can be a PMMA-based pearl polymer. Other materials such as acrylonitrile butadiene styrene (i.e., ABS), polycarbonate-acrylonitrile butadiene styrene (i.e., PC-ABS), polyamide (i.e., PA), polybutylene terephthalate (i.e., PBT), and metals could also be employed.

In addition, the particulate filler material can be glass, metals or carbon fibre.

Beneficially, the particulate material can have reaction initiator properties (e.g. benzoyl peroxide). Such an initiator could either be mixed with the particulate material or be dissolved in the grains of the particulate material.

In the preferred embodiment described, when a printing fluid with binder characteristics is printed onto a particulate material a chemical reaction takes place between the initiator found in the powder (BPO) and the catalyst (toluidine) found in the fluid. Radicals are formed which trigger polymerisation of the monomers.

Tests have shown that with such a system components with high strength can be made by a 3D printing process.

In order, however, to prevent deformation, the polymerisation reaction is delayed by the process of the invention.

The delay can be caused in various ways. Thereby, several effects can be used in order to control the reaction kinetics in such a way that deformation-free components can be produced.

A range of especially beneficial possibilities is described below:

The amount and type of initiator (e.g. benzoyl peroxide) determines the speed of polymerisation. Using four times the amount of an initiator doubles the reaction speed. Different initiators have different decay rates and different levels of effectiveness in starting the polymerisation reaction. A typical amount of initiator is less than 5% of the amount of monomer used, and 0.1 to 2% would be preferable, depending on the monomer used.

Through the addition of various amounts of catalyst (e.g. toluidine), the reaction speed can be controlled. Larger amounts of catalyst give fast polymerisation reactions. It is favourable to add amounts up to 5%. Better yet are additions of between 0.1 and 1%, depending on the monomer used.

The initiator (e.g. benzoylperoxide) can either be added with the particulate material or be dissolved in the grains. The polymerisation reaction is delayed if the initiator is included in the grain, because the grain must dissolve and the initiator must flow out before a polymerisation reaction can start. The solubility of the particulate material, the monomer's aggressiveness and temperature determine the speed of dissolution.

An appropriate choice of monomers can be made by a person skilled in the art to control reaction speed. Different monomers have different reaction speeds. In addition, it is possible to achieve an accelerated reaction through the use of a combination of different monomers in a binding system (e.g. copolymerisation of sterol and methylmethacrylate) in comparison to a one-component system.

The temperature at which the polymerisation occurs determines reaction speed. Higher temperatures increase the movement of molecules. Therefore they can find their reaction partner more quickly and polymerisation speed increases.

A further possibility to delay the reaction is through the use of a substance that slows down the reaction. It is of particular benefit to use such materials that can delay polymerisation reactions without dampening the reactivity of the system. One such delayer is, for example, benzochinone. Delayers, which generally slow down a reaction, lead to the result that not all of the monomer will be converted. Unreacted monomer is not favourable because it causes weakening of the component. This is not the case with delayers of the first type.

The possibilities listed above present only a selection of the choices. A person skilled in the art can tailor the reaction kinetics via the above methods to the demands of the process.

When setting the reaction speed in the sense of this invention, care must be taken that polymerisation takes place slowly enough that the shrinkage which occurs does not result in deformation of the component. In general this is achieved when the reaction time is greater than the time that the 3D printer needs to form the component.

In an especially preferred embodiment of this invention, the particulate material is set in a thickening material which quickly takes up the liquid and increases its viscosity. This decreases the tendency of liquid to soak into the powder bed and the geometry of the component is rendered exactly.

Of special benefit is that the thickening is achieved by the particulate material itself or its components. In a preferred embodiment of the invention this is achieved by using a polymer dissolved in the print fluid that raises its viscosity. In this way, even small amounts of polymer powder are sufficient to thicken the fluid.

Further beneficial embodiments of this present invention are submitted in the claims below as well as their descriptions.

In relation to FIG. 1, the following describes the order of printing according to a preferred embodiment of the invented process using layerwise construction of models made of particulate material and binding material as a rapid prototyping process.

According to the preferred embodiment described, the particulate material indicated is polyethylmethacrylate and the binding material is 1-pentanol.

In forming a component such as, for example, a casting model, a base platform 4 that the model is to be built on is sized to the layer thickness of the particulate material 5. Next, particulate material 5, for example a very fine, polyethylmethacrylate-based, alcohol-soluble plastic powder is applied using a layering tool 1 onto base platform 4 in the desired layer thickness. Next, the binder, for example pentanol, is selectively applied to the areas to be hardened. This can, for example, be carried out by means of a drop-on-demand droplet generator 3 of the ink jet printer type. This layering step is repeated until the finished component, bedded in loose particulate material 5, is complete.

To start with, the layering tool 1 is in the home position, which is shown in FIG. 1a.

As shown in FIG. 1b, the following describes the construction of a model with base platform 4 which is lowered by more than one layer.

Next the layering tool 1, as shown in FIG. 1c, travels across without depositing particulate material to the position opposite the filling device 2, until it stands over the border of base platform 4.

Now the base platform 4 is raised to exactly the height for layering, which can be seen in FIG. 1d. This means that base platform 4 is now exactly one layer thickness lower than the layer height.

Finally, the layering tool 1 is driven in a constant motion over base platform 4. This delivers particulate material 5 in exactly the right amount and coats base platform 4. This is shown in FIG. 1e.

The layering tool 1 moves back after the deposition run without deviation at high speed to the home position and can as needed be filled again with the filling device 2. This is shown in FIG. 1f.

The print head 3 now moves over base platform 4 and thereby doses the binder selectively in the areas where hardening is desired. This is shown in FIG. 1g.

Next, the print head 3 moves back to the home position and all elements are back in the starting position. This is shown in FIG. 1h, which corresponds to FIG. 1a.

The printing process for the binding material on particulate material 1 can be done during or after layering.

The steps 1a to 1h are repeated until the component, bedded in loose particulate material, is printed to the target height.

The component is left for a sufficient amount of time in the powder bed until adequate hardness is achieved.

Afterwards, it can be taken out and cleaned of any remaining powder.

The component can then be put through appropriate post-processes.

Figure 2:
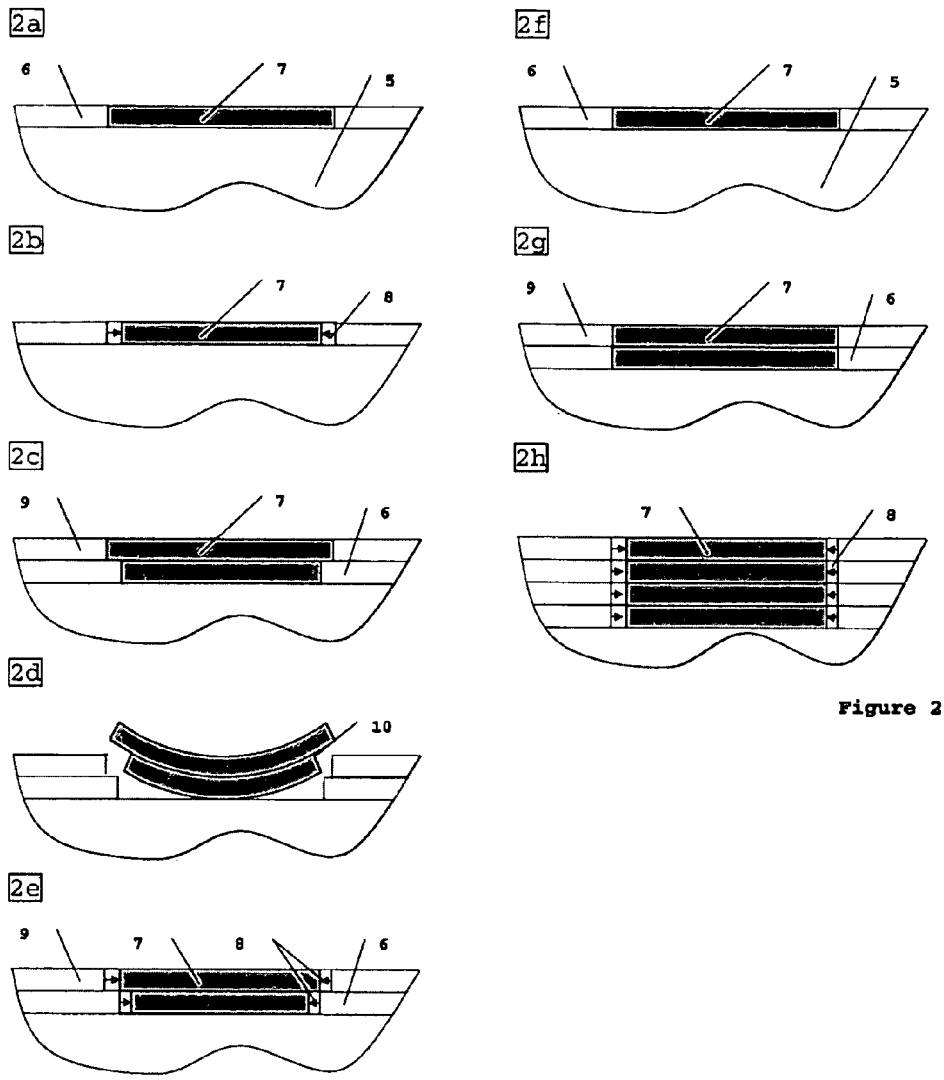
FIG. 2a-h, illustrate the effect of different hardening speeds on deformation.

In relation to FIG. 2 one can see the deformation effect with different setting speeds. Particulate material 5 and binder are applied alternately in a layer 6. The printed area 7 contracts resulting in shrinkage 8. In FIGS. 2a to 2e it is shown that over-rapid hardening and the consequent shrinkage can lead to geometry deformation in completed components. In the sense of this invention, this can be prevented using a targeted delay of the setting time as shown in FIGS. 2f to 2h.

Next, a layer 6 of particulate material 5 is printed with binder in area 7. This is shown in FIG. 2a.

The printed area 7 retracts 8 as a consequence of faster fixation. This is shown in FIG. 2b.

A second layer 9 of particulate material is applied and printed 7. This is shown in FIG. 2c.

This now also retracts in layer 9. Because both layers are combined with one another, the force is transmitted to the underside of layer 6.

If layer 6 is set hard enough, the tension within the layers causes curvature 10. This is shown in FIG. 2d.

The resulting component will display this curved deformation.

If the lower level is still soft, the tension is relieved through plastic deformation 8. This is shown in FIG. 2e.

Because this error is accumulated over many layers, the resulting component has sloping sides.

Model construction from layer 6 proceeds in the same way using delayed binding systems. However between the layers there is no hardening and therefore no shrinkage of the printed area 7. This is shown in FIGS. 2f and 2g.

The hardening and shrinkage 8 is delayed until after formation of the model. Thereby all areas of the component shrink virtually at the same time and by the same amount. There is no deformation. This is shown in FIG. 2h.

Figure 3:
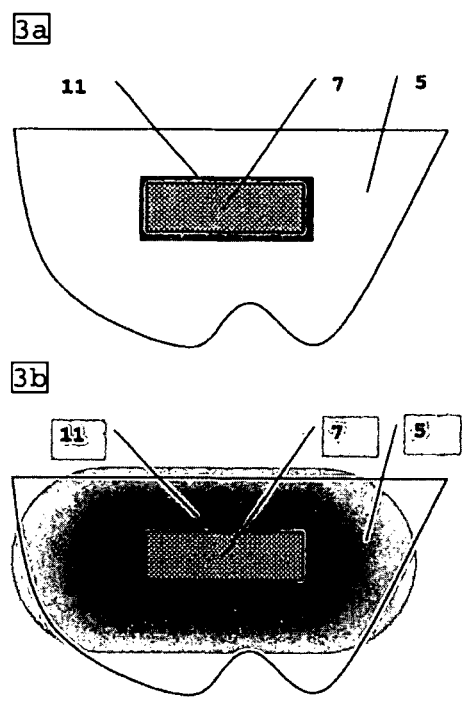
FIG. 3a-b, illustrate the drying of the component in a powder bed.

In relation to FIG. 3 the following describes the process for drying and setting of a solvent-based binder according to a preferred embodiment of the process in this invention.

According to the preferred embodiment described, the particulate material is polyethylmethacrylate and the binding material is 1-pentanol.

The component will, as described here, be constructed on a layered basis and, according to the preferred embodiment, the completed component, bedded in loose particulate material 5, will be left in the powder bed to dry.

In FIG. 3a it is shown that with too large an amount of insoluble filling material in particulate material 5, drying cannot take place completely. Because the solvent transport from the component primarily takes place over the contact points between particles in the printed area and particles in the surrounding powder bed, the insoluble particles make it more difficult for the solvent 12 to diffuse after several millimeters. The powder in this area 11 is completely saturated and cannot further absorb solvent from the component 7.

With a system using polyethylmethacrylate particulate material and polymethylmethacrylate filling material, and a pentanol binder, saturation occurs after approximately 5 hours. The thickness of the marginal layer is about 2 mm.

If there is sufficient soluble particulate material around the component, the solvent can diffuse unhindered into the material around it away from the component, and therefore dries. This is shown in FIG. 3b.

If a pure and soluble polyethylmethacrylate particulate material is used without filler, the solvent can escape over the surrounding powder from the component. It dries almost completely within 24 hours.

A stronger solvent can also be used as a binder, so that even the filler allows passage of the binder.

TABLE 1

| No. | components | weight-percentage/[%] |
|---|---|---|
| (5) | particle material | |
| (12) | base material | |
| | PMMA-beads | 2-100 |
| (13) | initiator | |
| | Benzoylperoxid (dissolved in base material) | 0.1-5 |
| (14) | filler | |
| | i.e. metal powder, glass-/carbon fiber, insoluble polymer | 5-98 |
| (22) | Binder | |
| (15) | monomers | |
| (15a) | styrol | 0-75 |
| (15b) | hydoxyethylmethacrylate | 25-100 |
| (16) | Cross linker | |
| | polyethylenglykol-dimethacrylat | 0-50 |
| (17) | accelerator/catalyst | |
| | N,N-dimethyl-p-toluidin | 0.5-1.5 |
| (18) | Delayer | |
| | p-benzochinon | 0-0.3 |

Formulas

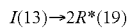

$$I(13) \rightarrow 2R^*(19) \quad \text{1a}$$

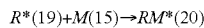

$$R^*(19) + M(15) \rightarrow RM^*(20) \quad \text{1b}$$

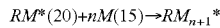

$$RM^*(20) + nM(15) \rightarrow RM_{n+1}^* \quad \text{1c}$$

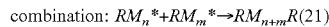

$$\text{combination: } RM_n^* + RM_m^* \rightarrow RM_{n+m}R(21)$$

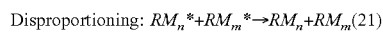

$$\text{Disproportioning: } RM_n^* + RM_m^* \rightarrow RM_n + RM_m(21) \quad \text{1d}$$

In relation to Table 1 and Formulas 1a-1d the following shows the process for drying and hardening of a binder based on radical polymerisation solvent according to a preferred embodiment of the process in the invention.

A special benefit is that the particulate material can be polymethylmethacrylate-based and the binder can be based on various methacrylates and/or styrols. The functioning of such a powder/liquid system is shown in Table 1.

The component is, as already described, to be constructed in a layered manner from a particulate material and a binder.

As soon as the binder from the print head meets the particulate material, the interactions between different parts of the system begin.

Next, the base material is dissolved 12. This causes the initiator 13 in the base material 12 to float out of the grains. The speed of this step is determined by the solubility of the base material 12 and the solvent strength of the binder 22. As shown in Formula 1a, the initiator 13 is split by the accelerator 17 and forms radicals 19.

These radicals split the double bonds of monomer 15 and react with monomer radicals 20. This is shown in Formula 1b.

The addition of further monomers 15 to the monomer radicals 20 forms a macromolecule 21. The choice and composition of the monomer 15 can control the speed of the growth reaction. The growth reaction is presented in Formula 1c.

The growth reaction is terminated by the size of the macromolecule. There are various termination mechanisms described in the literature. Formula 4e shows breaking of the chain through combination and disproportionation.

What is claimed is:

1. A self-hardening material for layerwise construction of three-dimensional components comprising:
   (i) at least one particulate material;
   (ii) a bonding agent including a polymerizable monomer for bonding the particulate material; and
   (iii) a delayer for delaying a polymerization reaction;
   wherein the bonding agent is separate from the particulate material,
   wherein the particulate material includes polymethylmethacrylate, polyethylmethacrylate acrylonitrile butadiene styrene (i.e., ABS), polycarbonate-acrylonitrile butadiene styrene (i.e., PC-ABS), polyamide (i.e., PA), polybutylene terephthalate (i.e., PBT), a metal, glass, or carbon fiber,
   wherein the particulate material includes an initiator and is a loose material suitable for applying in a layerwise fashion,
   wherein the bonding agent is a printable liquid suitable for applying over the particulate material and is separate from the particulate material, and
   wherein a setting time of the material is greater than 20 times as long as an application time of a particulate layer.

2. The self-hardening material as per claim 1, wherein the setting time of the material is from greater than 20 times to 150 times as long as the application time of each layer.

3. The self-hardening material as per claim 1, wherein the bonding agent is based on acrylates, methacrylates, or styrols.

4. The self-hardening material as per claim 1, wherein the bonding agent contains a solvent.

5. A multi-layered structure comprising:
   a first layer of a self-hardening material according to claim 1, and
   a second layer of a self-hardening material according to claim 1,
   wherein the first layer and the second layer each include a layer of the one particulate material to which the bonding agent is applied separately,
   wherein the second layer is applied on top of the first layer while the first layer is not yet hardened, and
   wherein the first layer and the second layer shrink by the same amount and at the same time.

6. The self-hardening material as per claim 1, wherein the self-hardening material includes an UV active compound.

7. The self-hardening material as per claim 1, wherein the initiator is benzoyl peroxide.

8. The self-hardening material as per claim 1, wherein the bonding agent is a polyurethane resin or epoxy resin.

9. The self-hardening material as per claim 1, wherein the bonding agent contains further ingredients that increase or decrease viscosity and/or surface tension so that printability is improved.

10. The self-hardening material as per claim 4, wherein the particulate material includes a base material that is soluble in the solvent and a filler material that is insoluble in the solvent.

11. The self-hardening material as per claim 10, wherein setting of the bonding agent takes place after formation of the three-dimensional components.

12. The self-hardening material as per claim 11, wherein the three-dimensional components demonstrate uncured setting within 72 hours, and wherein a tension within the three-dimensional components causes curvature of the three-dimensional components.

13. A self-hardening material for layerwise construction of three-dimensional components comprising:
   a. at least one particulate material;
   b. a printable bonding agent for bonding the particulate material;
   c. an initiator; and
   d. a delayer so that a setting time of the bonding agent is greater than 20 times as long as an application time of a particulate layer,
      wherein the bonding agent is separate from the particulate material and the particulate material includes the initiator.

14. The self-hardening material as per claim 1, wherein the delayer is benzochinone.

15. The self-hardening material as per claim 13, wherein the particulate material includes a filler, and the bonding agent contains a solvent and a moisture-containing material which slows down volatilisation of the solvent.

16. The self-hardening material as per claim 10, wherein the bonding agent includes a moisture-containing material, and the filler material is a metal powder, a glass, a carbon fiber, or an insoluble polymer.

17. A self-hardening material for layerwise construction of three-dimensional components comprising:
   (i) at least one particulate material;
   (ii) a bonding agent, such as a polymerizable monomer, for bonding the particulate material; and
   (iii) a delayer for delaying a polymerization reaction;
   wherein the particulate material includes polymethylmethacrylate, polyethylmethacrylate, acrylonitrile butadiene styrene (i.e., ABS), polycarbonate-acrylonitrile butadiene styrene (i.e., PC-ABS), polyamide (i.e., PA), polybutylene terephthalate (i.e., PBT), a metal, glass, or carbon fiber,
   wherein the bonding agent is based on acrylates, methacrylates, or styrols,
   wherein the bonding agent contains a solvent and a material which slows down volatilisation of the solvent,
   wherein the delayer is benzochinone,
   wherein the initiator is benzoyl peroxide, and
   wherein the particulate material is a loose material suitable for applying in a layerwise fashion, and
   wherein the bonding agent is a printable liquid suitable for applying over the particulate material.

18. A multi-layered structure comprising:
   a first layer of a self-hardening material according to claim 1, and
   a second layer of a self-hardening material according to claim 1,
   wherein the first layer and the second layer each include a layer of the one particulate material to which the bonding agent is applied separately,
   wherein the second layer is applied on top of the first layer when less than 5% of setting of the material and less than 5% of shrinkage of the material occur in the first layer, and
   wherein the first layer and the second layer shrink by the same amount and at the same time.

19. The self-hardening material according to claim 1,
   wherein the particulate material includes from 2-100 weight percent PMMA-beads, 0.1 to 5 weight percent benzoyl peroxide; and 5 to 98 weight percent filler; and
   wherein the binder includes 0 to 75 weight percent styrol monomer, 25 to 100 weight percent hydroxyethylemethacrylate monomer, 0 to 50 weight percent polyethylene glycol-dimethacrylate; 0.5 to 1.5 weight percent N,N' dimethyl-p-toluidin, and 0.3 weight percent or less p-benzochinone.

20. The self-hardening material according to claim 1, wherein the particulate material includes polyethylmethacrylate, acrylonitrile butadiene styrene (i.e., ABS), polycarbonate-acrylonitrile butadiene styrene (i.e., PC-ABS), polyamide (i.e., PA), polybutylene terephthalate (i.e., PBT), a metal, glass, or carbon fiber.

21. The self-hardening material according to claim 1, wherein the delayer delays a polymerization reaction without dampening the polymerization reaction.

22. A self-hardening material for layerwise construction of three-dimensional components comprising:
   a. at least one particulate material;
   b. a printable bonding agent for bonding the particulate material; and
   c. an initiator; and
   wherein the initiator is dissolved in grains of the particulate material so that setting of the bonding agent is delayed;
   wherein a setting time of the bonding agent is greater than 20 times as long as an application time of a particulate layer,
   wherein the bonding agent is separate from the particulate material.

23. The material of claim 22, wherein the bonding agent includes a combination of different monomers for copolymerization.

24. The material of claim 23, wherein the different monomers include sterol and methylmethacrylate.

25. The material of claim 24, wherein the initiator includes benzoyl peroxide.

* * * * *